United States Patent [19]

Sparkia

[11] Patent Number: 4,780,930

[45] Date of Patent: Nov. 1, 1988

[54] POULTRY CUTTER WITH A ROTATABLE ARBOR AND GUIDE MEANS

[75] Inventor: Leo Sparkia, South Bend, Ind.

[73] Assignee: Fabricated Products, South Bend, Ind.

[21] Appl. No.: 90,902

[22] Filed: Aug. 31, 1987

[51] Int. Cl.[4] .............................................. A22C 21/00
[52] U.S. Cl. .......................................... 17/11; 17/44.1
[58] Field of Search .................... 17/11, 1 R, 24, 44, 17/44.1, 71

[56] References Cited

U.S. PATENT DOCUMENTS

| | | | |
|---|---|---|---|
| 3,114,403 | 12/1963 | Rianda | 83/435.2 X |
| 4,385,419 | 5/1983 | Cantrell | 17/11 |
| 4,558,490 | 12/1985 | Hazenbroek et al. | 17/11 X |

Primary Examiner—Willie G. Abercrombie
Attorney, Agent, or Firm—James D. Hall

[57] ABSTRACT

An automatic machine for sectioning poultry consisting of a series of rotatable blades for severing selected parts from the bird and a rotatable arbor associated with a conveyor belt to position the bird properly with respect to the blades.

7 Claims, 6 Drawing Sheets

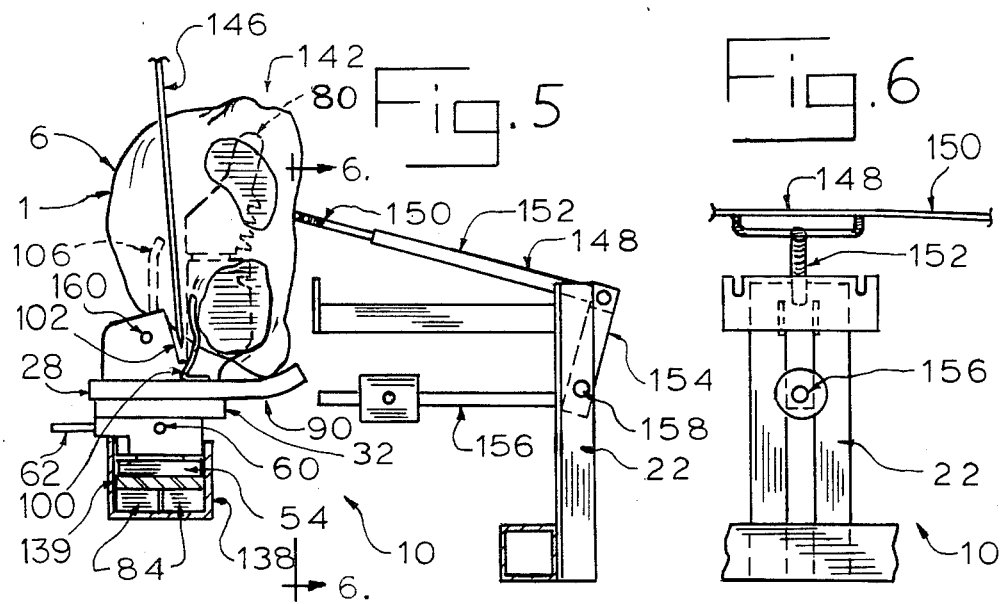
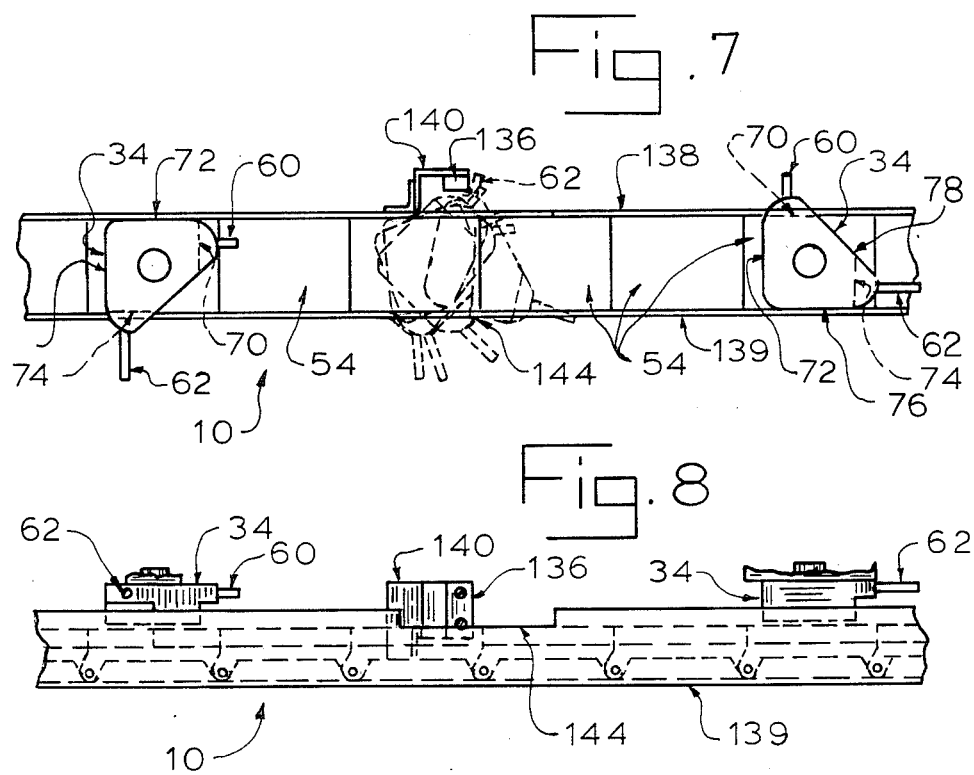

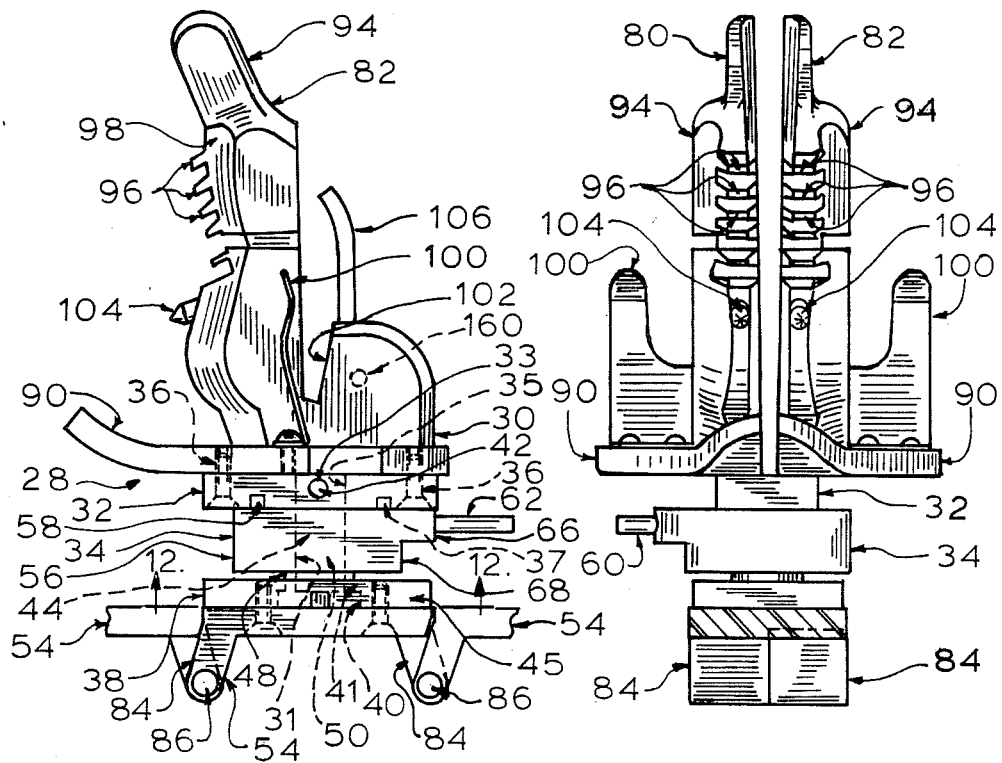

POULTRY CUTTER WITH A ROTATABLE ARBOR AND GUIDE MEANS

SUMMARY OF THE INVENTION

This invention relates to automated poultry cutters.

Automated poultry cutters are commonly used in the industry and allow a producer or fast food chain to lower prices on poultry parts due to the reduced cost of automated cutting.

Heretofore, automated poultry cutters have implemented a clamp and gravity system for retaining the bird in the proper positions during the cutting process as can be seen in U.S. Pat. Nos. 3,950,820 and 3,689,945. A problem associated with such retaining means is that the placement of the bird on the retaining device is cumbersome and highly critical to the cutting process. A bird improperly placed on the retaining device will not be properly cut causing uneven portions which is undesirable to the seller and an improperly cut bird may even clog the discharge paths of the machine. A further problem associated with the prior bird retaining means is that due to the complicated nature of the retaining device, the number of birds processed an hour is reduced which thereby increases production costs.

The poultry cutter of this invention eliminates these problems by using a spindle or arbor connected to a conveyor belt to transport the vertically oriented bird through numerous cutting stations. The arbor is pivotable about its vertical axis in order to position the bird properly with respect to a series of rotating blades. The arbor is designed so to allow an operator to quickly and easily place the bird upon the arbor by spreading the legs and placing the pelvic girdle of the dressed bird over the vertical support of the arbor. The ease of loading a bird allows a greater number of birds to be processed per hour which reduces production cost. In addition, by implementing a retaining device not directly dependent upon gravity, the likelihood of clogs or jams is greatly reduced.

Accordingly, it is an object of this invention to provide for an improved automated poultry cutter.

Another object of this invention is to provide for an automated poultry cutter with a rotatable arbor.

Another object of this invention is to provide for an automated poultry cutter having an increased production capacity.

Other objects of this invention will become apparent upon a reading of the following descriptions taken with the accompanying drawings.

BRIEF DESCRIPTIONS OF THE DRAWINGS

A preferred embodiment has been depicted for illustrative purposes only wherein:

FIG. 5 is a fragmentary sectional view taken along line 5—5 of FIG. 4.

FIG. 6 is a fragmentary sectional view taken along line 6—6 of FIG. 5.

FIG. 7 is a fragmentary top plan view of the conveyor which illustrates the arbor indexing mechanism of the invention.

FIG. 8 is a fragmentary side elevation view of the arbor indexing mechanism of FIG. 7.

FIG. 9 is a side elevational view of the arbor.

FIG. 10 is a front elevational view of the arbor.

FIG. 11 is a top plan view of the arbor.

FIG. 12 is a cross sectional view of the arbor taken along line 12—12 of FIG. 9.

DESCRIPTION OF THE PREFERRED EMBODIMENT

The preferred embodiment herein described is not intended to be exhaustive or to limit the application to the precise form disclosed. It is chosen and described to explain the principles of the invention and its application and practical use to enable others skilled in the art to utilize the invention.

Figure 1:
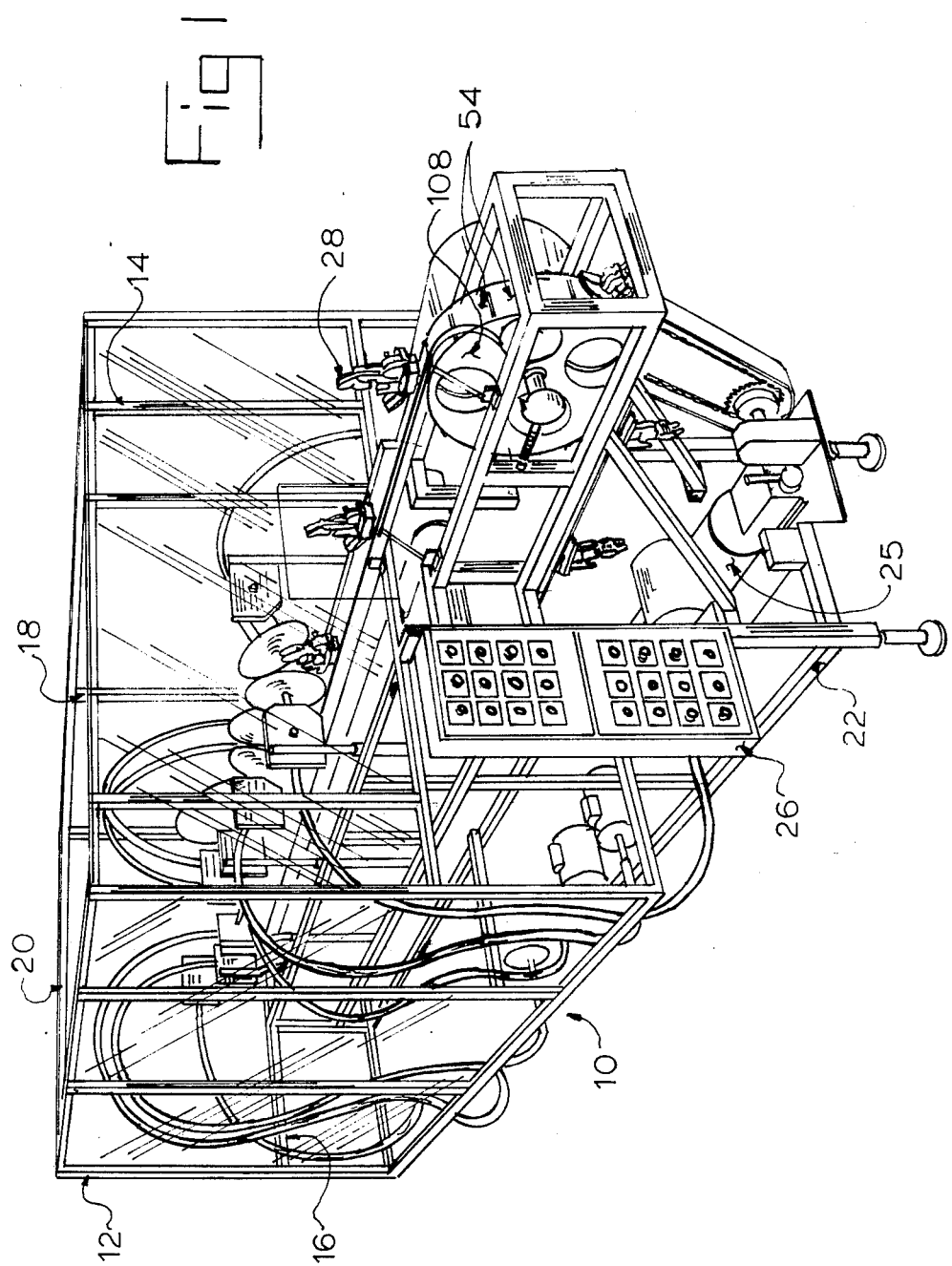
FIG. 1 is a perspective view of the automated poultry cutter of this invention.

Referring now to FIG. 1, it can be seen that the operating components of the poultry cutter 10 are preferably housed within a generally rectangular transparent enclosure which includes side walls 12 and 14, end walls 16 and 18, and a top 20. The operating components of cutter 10 are supported by frame 22. A control box 26, as is typical in industry, is included to allow for centralized control of all components of cutter 10 by a single user.

In order to provide a fuller understanding of the poultry cutter of this invention, a brief overview of the sequence of events will be provided before a detailed description of the components is undertaken.

Figure 4:
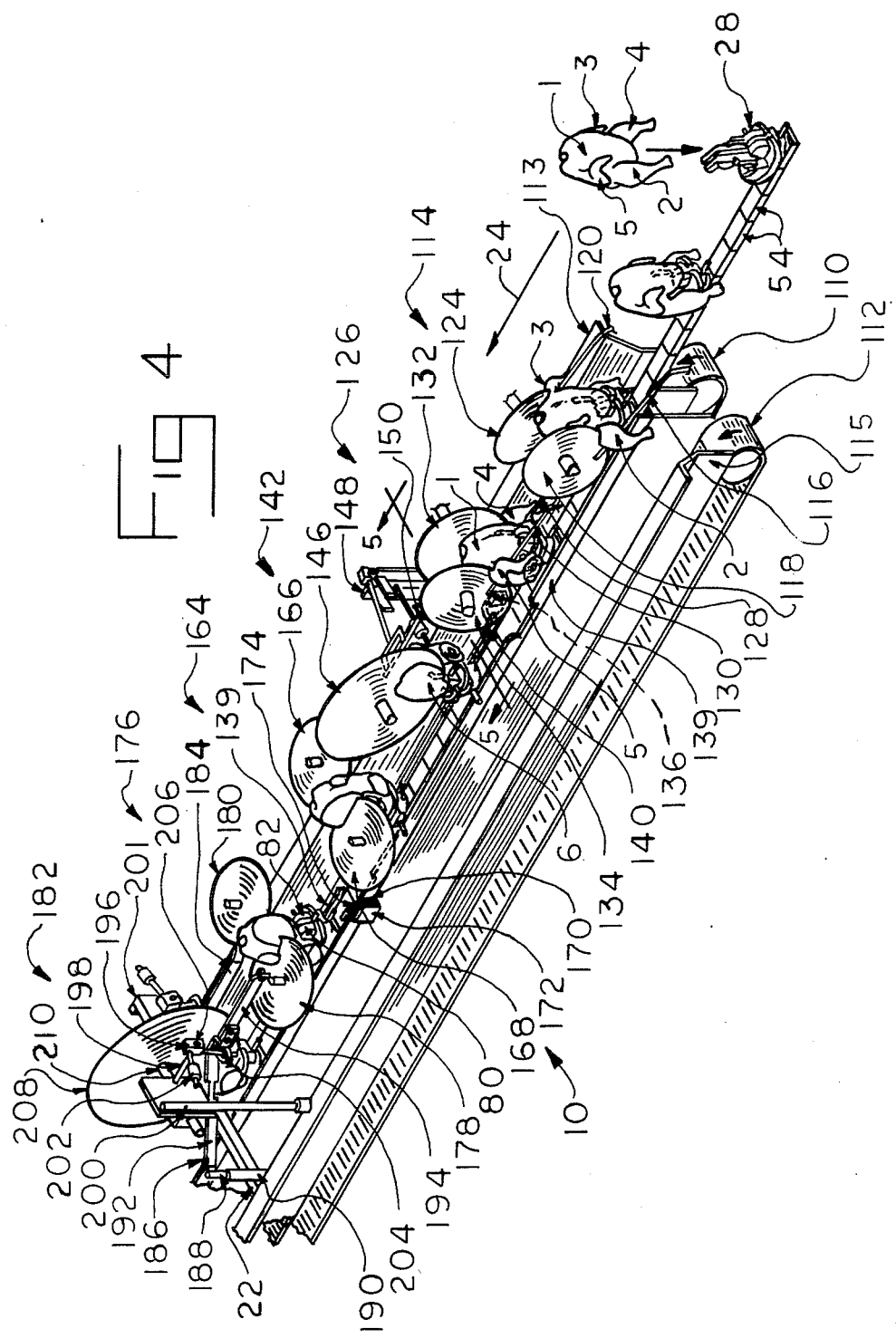
FIG. 4 is a fragmentary perspective view of the conveyor which illustrates the progressive cutting of the poultry.

Referring to FIG. 4, it can be seen that bird 1 is initially placed onto one of a plurality of spaced arbor assemblies 28 which moves along an endless conveyor in the direction of arrow 24 toward a series of cutting stations. The first cutting station designated by numeral 114 has two rotating blades 118, 124 which remove the right leg 2 and left wing 3 of bird 1. Bird 1 and arbor assembly 28 continue in the direction of arrow 24 to the second cutting station designated by numeral 126 where the left leg 4 and right wing 5 are removed by rotating blades 132, 134. Arbor assembly 28 is then rotated 90° and the breast 6 is cut from bird 1 by rotating blade 146 at the third cutting station designated by numeral 142. Two horizontal cuts at the bird's midsection are made by blades 166, 168 at the forth cutting station designated by numeral 164, whereupon the arbor is rotated 90° back to its original position. Two more horizontal cuts are then made by blades 178, 180 at the fifth cutting station indicated by numeral 176. Finally, the sixth cutting station, designated by numeral 182 includes a blade 208 which makes a vertical cut in the middle of bird 1 which in combination with the horizontal cuts previously made at fourth cutting station 164 and fifth cutting station 176 slices the bird into four separate pieces. There-fore, the entire process has the ability to cut a poultry carcass into none separate pieces.

A detailed description of the components of poultry cutter 10 follows. Arbor assembly 28, shown in detail in FIGS. 9–12, includes a bird support 30 which is preferably formed of food grade nylon. Bird support 30 includes symmetrical support parts 80, 82 each of which includes an upright post 94 shaped as shown in FIGS. 9–10 integrally joined to a table 90. Post 94 includes an integral back support 98 having protrusions 96 to engage the back of bird 1. Thigh retaining tab 100 (as shown in FIGS. 9 and 10) is fastened to table 90 in alignment with notch 102 to extend the thigh and leg of the bird for cutting. A metal spike 104 extends outwardly from post 94 at a slight downward angle to limit the upward movement of the bird during the cutting process. A curved metal rod 106 extends upwardly from support 80 to aid in breast extension of bird 1. Support parts 80, 82 are connected to a plate 32 by fasteners 36 in the space apart fashion shown in FIG. 10. Plate 32 defines a central through bore 35 and a plurality of alignment bores 37. A transverse through bore 33 is defined in plate 32 and extends diametrically through the plate and into bore 35. Plate 32 is connected to an arbor guide 34 by alignment pins 58 which fit within bores 37.

An arbor guide 34 includes a body 56 which has integrally formed tiers 66 and 68 of a metal or food grade nylon material. Indexing pins 60 and 62 extend outwardly of body 56 and are preferably spaced ninety degrees from each other. Lower tier 68 of body 56 is formed in a generally pentagonal configuration having walls 70, 72, 74, 76 and 78 as shown in FIG. 12. Lower tier 68 is formed in such a way that the distance between wall 70 and 76 is equal to the distance between walls 72 and 74. Arbor guide 34 also includes a central through bore 31.

Base assembly 38 includes plate 46 which defines a central bore 40 which has an upper shoulder 41. Collar 48 is fitted into bore 40 which reduces the inner diameter of bore 40 and terminates at shoulder 41. Collar 48 extends above the top of plate 46 as shown to space guide 34 above plate 46. Shaft 44 which includes a shank 50 and a head 52 (FIG. 12) is rotatably fitted within bore 40. Shaft 44 is positioned with its shank 50 extending through arbor guide bore 31 and into plate bore 35 with its head 52 abutting shoulder 41. A stop 54 extends a partial distance into bore 40. Head 52 defines a peripheral slot 43 which has terminal walls 47, 49 to abut stop 54 and, whereby, limit the rotation of shaft 44.

Figure 2:
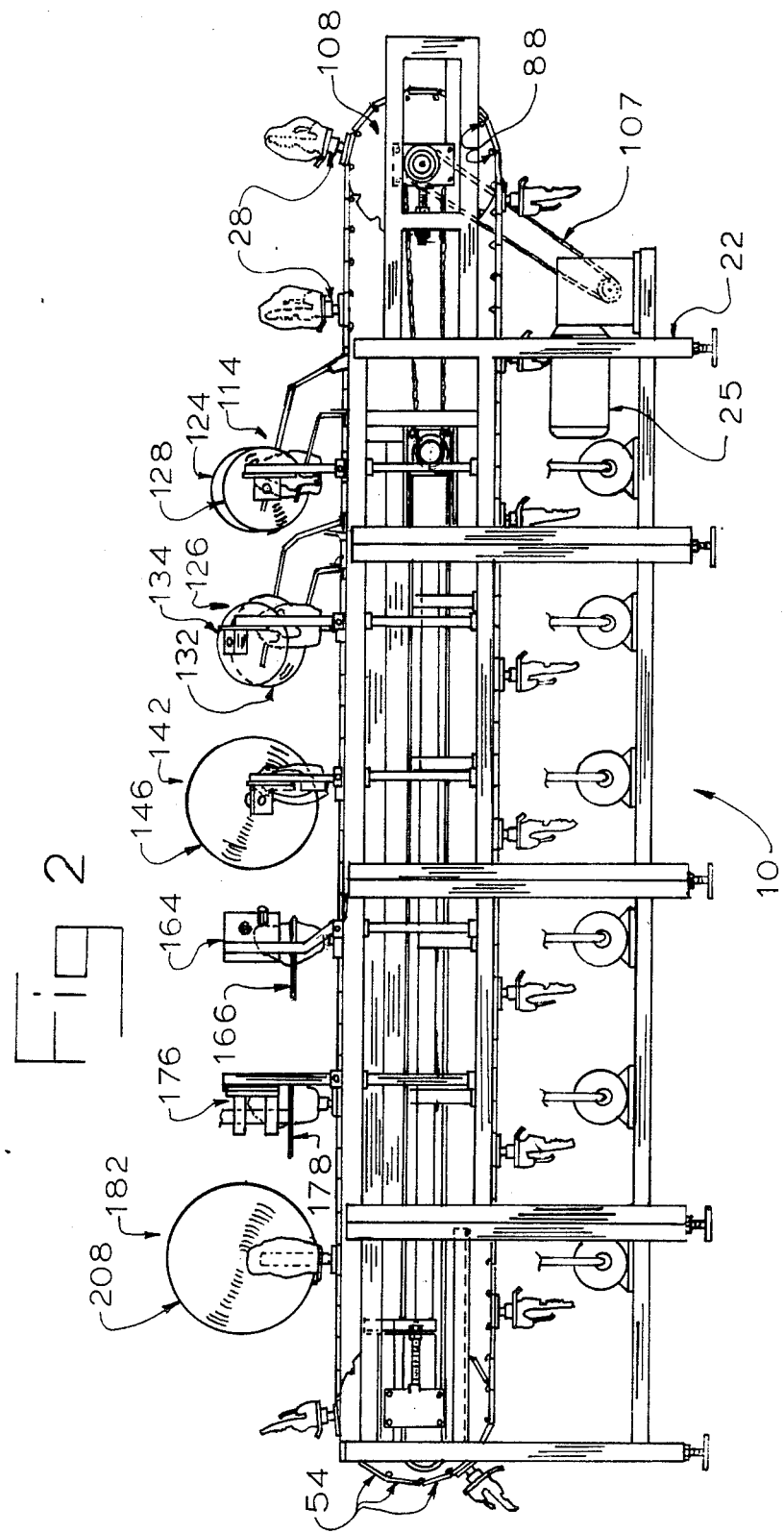
FIG. 2 is a side elevational view of the poultry cutter with portions omitted for clarity.
Figure 3:
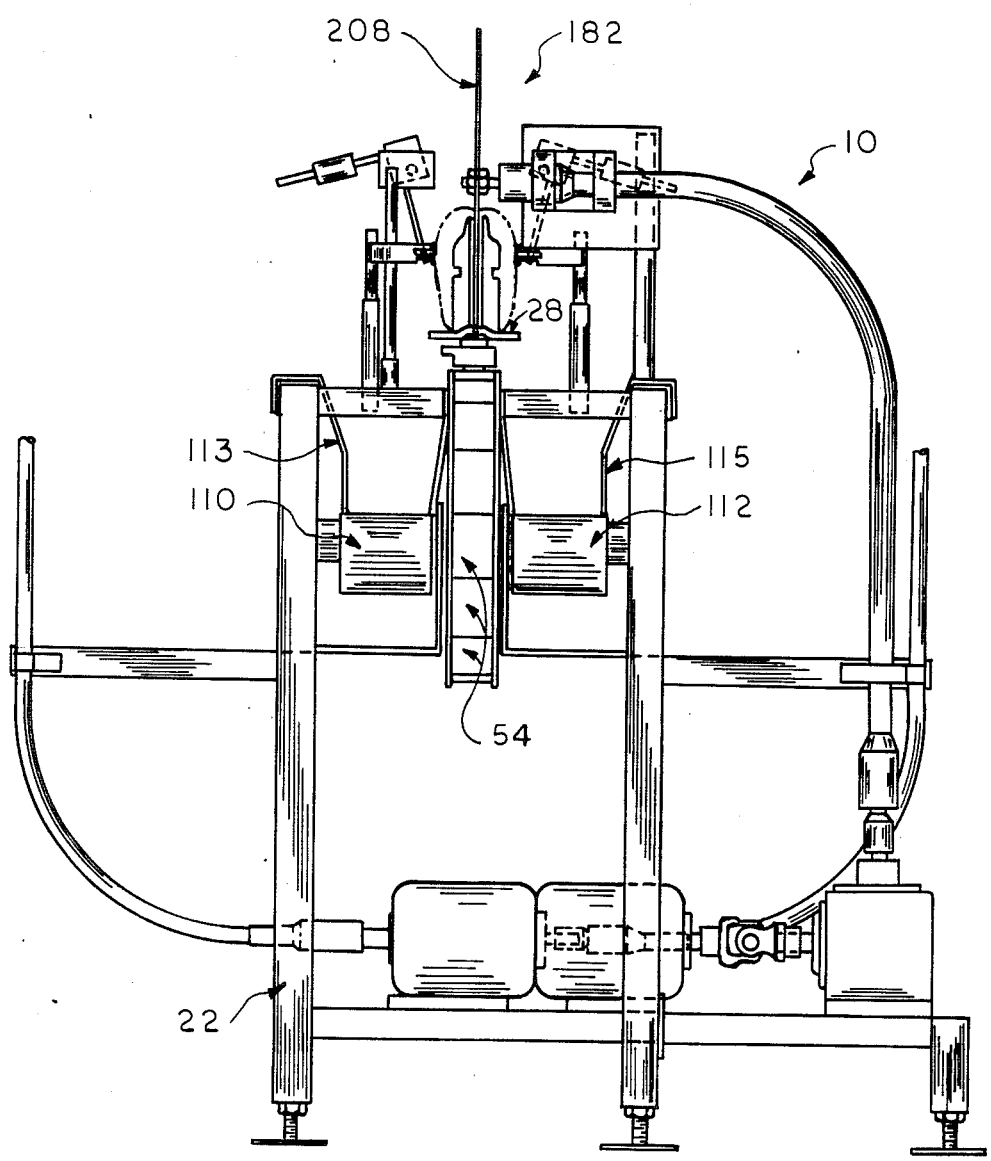
FIG. 3 is an end elevational view of the poultry cutter with portions emitted for clarity.

Base 38 is secured in a fixed relation to plate 32 by pin 42 which extends through bores 64 in shaft 44 and completely through plate bores 33, 35. Base assembly 38 is connected by fasteners 36 to conveyor part 54 as shown in FIG. 9. A series of conveyor parts 54, which are well known in the art, are connected so as to form a continuous loop as shown in FIG. 2.

A plurality of arbor assemblies 28 are linked in a continuous endless conveyor equally spaced apart by conveyor links 54 which are driven by conventional means such as motor 25 which is connected by a drive belt 107 to drive wheel 108. Each conveyor link 54 includes opposite downwardly projecting legs 84. Links 54 are connected by pins 86 extending through legs 84 which fit within notches 88 in drive wheel 108 to transport links 54 and the arbors assemblies 28 to the various cutting stations. Links 54 are held in horizontal alignment by side rails 138 and 139 as shown in the drawings. Two endless conveyor belts 110 and 112 along with appropriate guide walls 113, 115 are positioned one on each side of conveyor links 54 to catch and transfer the cut poultry pieces from the various cutting stations to a central collection point (not shown).

The dismembering and cutting of bird 1 is accomplished by passing the bird 1 and arbor assemblies 28 through a series of six cutting stations as shown in FIGS. 1–4. Bird 1 is first fitted onto arbor assembly 28 in a sitting position (FIG. 4) with post 94 entering through the pelvic girdle and into the bird's body cavity with the back of the bird facing the first cutting station. Thighs 2 and 4 of the bird 1 will be positioned behind thigh retaining tabs 100 as shown to extend the thighs for cutting. Bird 1 is then advanced by conveyor links 54 to cutting station 114 which includes an angled rod 116 which contacts the right leg 2 of the bird to lift it into position for severing by rotating cutting blade 118 which is positioned essentially perpendicular to the conveyor. A rod 120 is positioned with one end attached to frame 22. Rod 120 angles upwardly and is positioned such that as the bird progresses in the direction of arrow 24, the left wing 3 engages the angled portion of rod 120 and is lifted into position where inwardly angled blade 124 severs the wing at the socket. Leg 2 and wing 3 drop onto a respective conveyor 110, 112 and are transported to a collection point (not shown). It should be noted that blades 118 and 124 and all subsequent blades may be rotated conventionally by either electric motors as shown or by a hydraulic motor.

Bird 1 then advances to second cutting station 126 which includes angled rods 128 and 130 to position the left leg 4 and right wing 5 of the bird for severing by rotating blades 132 and 134 respectively. Rods 128, 130 and blades 132, 134 are positioned and function in the manner described in cutting station 114 with the exception that they lift and remove the left leg 4 and right wing 5 of bird 1.

A block 136 is connected to a bracket 140 and extends outwardly from and above side rail 138 as shown in FIG. 7. Block 136 is positioned between cutting stations 126 and 142, as shown in FIG. 4. The indexing of arbor assembly 28 is illustrated in FIG. 7, which shows that as arbor assembly 28 passes block 136 indexing pin 60 contacts the block to rotate arbor assembly 28 approximately ninety degrees. Since side rails 138 and 139 are spaced so as to normally limit rotation of arbor assembly 28 by contacting walls 70 and 76 of arbor guide 34, side rail 139 defines a notch 144 which allows arbor guide 34 to rotate upon pin 60 contacting stop block 136. A flange is formed on the trailing edge of notch 144 which aids in re-aligning arbor assembly 28 by contacting wall 74 of arbor guide 34.

The third cutting station 142 includes cutting blade 146 which is positioned so as to remove the breast portion 6 from the bird as arbor assembly 28 and bird 1 passes. A weighted pressure bar mechanism 148 is included to press against the bird's back so that a greater quantity of breast meat is exposed during cutting. The pressure bar mechanism 148 shown in FIGS. 5 and 6, is connected to frame 22 by bolt 158 and includes vertical strut 154 connected to horizontal extension bar 152. An inwardly angled horizontal bar 150 is connected to extension bar 152. A weighted bar 156 is connected to frame 22 by bolt 158. Bolt 158 forms a fulcrum or pivot point between weighted bar 156 and extension 154. As bird 1 advances towards cutting blade 146, it contacts bar 150 which, under the influence of weighted bar 156 urges the bird's back against supports 80 and 82 to expose more of the breast which is cut from the bird by blade 146. Blade 146 passes through notch 102 formed in support parts 80 and 82. The bird's breast falls onto pin 160 of arbor assembly 28 which urges the breast onto conveyor 112 for transport to the collection point (not shown).

Bird 1 is then advanced to the fourth cutting station designated by numeral 164 which includes two substantially horizontal cutting blades 166, 168 which are positioned approximately halfway up the bird and which horizontally cut through the back and remaining breast portion.

A second stop block 170 is attached to a bracket 172 and extends outwardly from and above side rail 139 so as to contact indexing pin 62 as arbor assembly 28 and bird 1 continue to move in the direction of arrow 24. Upon pin 62 contacting stop block 170 arbor assembly 28 rotates counterclockwise substantially 90° back to its original position. Again, to allow arbor guide 34 to rotate upon pin 62 contacting stop block 170, side rail 138 defines a notch 174. A flange is formed in the trailing edge of notch 174 which aids in re-alignment of arbor assembly 28 by contacting wall 76 of guide 34.

The bird then advances to the fifth cutting station designated by numeral 176 which includes two horizontal rotating blades 178, 180 positioned in alignment with blades 166, 168 so as to make a complete horizontal cut at a vertical midpoint on the bird.

The bird then advances to sixth and final cutting station, designated by numeral 182, which includes pivoting pressure bar assemblies 184 and 186 which contact the opposite sides of the now severed upper half of bird 1. Assembly 184 is essentially identical to assembly 186, therefore, only assembly 186 will be described. Pivoting pressure bar assembly 186 includes pivot pin 188 journalled within support cylinder 190 which is connected by conventional means (not shown) to frame 22. Arm 192 is connected between pin 188 and poultry contacting arm member 194. Arm 192 and arm member 194 preferably form an oblique angle at their junction. The free end of arm member 194 is curved outward slightly to accommodate slight variations of bird alignment. A counter weight assembly 196 is pivotally connected via extension 198 to vertical blade support 200. Counter weight assembly 196 includes horizontal weighted rod 202 and vertical rod 204 which are connected to pivoting block 206 and form a right angle relative to each other. A cutting blade 208 supported by vertical blade supports 200, 201 is journalled on shaft 210 and makes a vertical cut completely through bird 1 passing between support parts 80 and 82, whereupon, the four pieces formed by the two horizontal and one vertical cut drop into a collection area (not shown) for further processing.

It is to be understood that the invention is not to be limited to the details above described but may be modified within the scope of the following claims.

What I claim is:

1. In a machine for cutting poultry into its various edible parts, said machine including a plurality of holder means each for supporting a dressed bird, a plurality of cutting means for selectively dismembering and cutting said bird into individual parts, said holder means connected to an endless conveyor means for transporting the holder means and said dressed birds to each cutting means, the improvement wherein each holder means includes an upright bird support member pivotally connected to said conveyor means for rotative movement of said support member and supported bird, each support member adapted to enter the eviscerated cavity of said bird, said support member being formed of two symmetrical parts which together define an outer peripheral configuration generally conforming with the inner shape of said cavity, said support member including protrusion means for engaging said bird, said support member being separated by a vertical slot means for accommodating a said cutting means as each holder means is transported to said last mentioned cutting means, each holder means including a table under said support member parts, said vertical slot means extending through said table.

2. The machine of claim 1 wherein said machine further includes rod means positioned before said first and second cutter means for contacting a bird extremity to separate the extremity from the bird whereby bird dismemberment is facilitated.

3. The machine of claim 1 wherein said support member further includes a horizontal slot means for accommodating another said cutting means, said support member parts each defining a part of said horizontal slot.

4. The machine of claim 1 wherein said support member includes a second vertical slot means for accommodating a second cutting means, said support member parts each defining a part of said second vertical slot means, said second vertical slot means being transverse to said first vertical slot means.

5. The machine of claim 4 and a rod means extending upwardly from one of said support member parts and defining a part of said second vertical slot means for engaging said bird at its breast to support portions thereof during passage of said second cutting means through the second vertical slot means.

6. The machine of claim 1 wherein said protrusion means is a plurality a vertically aligned downturned protrusions carried by each of said support member parts along said vertical slot means.

7. The machine of claim 6 and a spike means carried by each support member part below said protrusions for limiting movement of said bird during cutting.

* * * * *